United States Patent [19]

Langley

[11] Patent Number: 5,685,677
[45] Date of Patent: Nov. 11, 1997

[54] MECHANICALLY ADJUSTABLE WEDGE ASSEMBLY

[75] Inventor: William T. Langley, Norwich, Conn.

[73] Assignee: Electric Boat Corporation, Groton, Conn.

[21] Appl. No.: 472,012

[22] Filed: Jun. 6, 1995

[51] Int. Cl.⁶ .................................. F16B 2/00; F16B 3/00
[52] U.S. Cl. .................................. 411/33; 411/32; 411/35; 254/104
[58] Field of Search .................................. 411/32, 33, 55, 411/63, 64, 65; 254/104

[56] References Cited

U.S. PATENT DOCUMENTS

| | | |
|---|---|---|
| 624,601 | 5/1899 | Wyman . |
| 1,499,560 | 7/1924 | Stangeland . |
| 1,824,729 | 9/1931 | Miller et al. .................................. 254/104 |
| 2,357,903 | 9/1944 | Miller .................................. 254/104 |
| 2,567,465 | 9/1951 | Barbour . |
| 4,050,675 | 9/1977 | Mongillo . |

*Primary Examiner*—Rodney M. Lindsey
*Assistant Examiner*—Fredrick Conley
*Attorney, Agent, or Firm*—Brumbaugh, Graves, Donohue & Raymond

[57] ABSTRACT

A mechanically adjustable wedge assembly including a cruciform-shaped driver and mating idlers applies force in multiple directions simultaneously thereby achieving the effect of several wedges in a single unit.

6 Claims, 4 Drawing Sheets

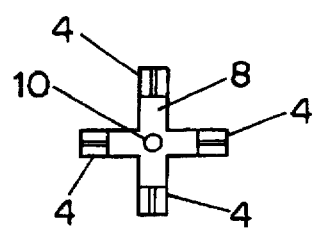
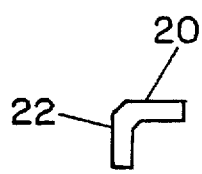
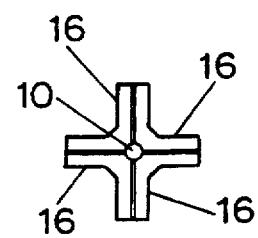
FIG. 1(b)  FIG. 2(b)  FIG. 3(b)
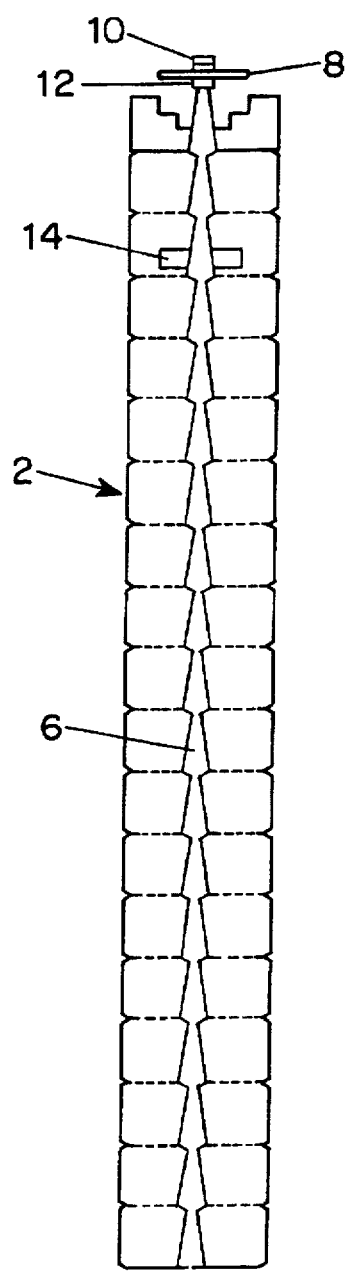
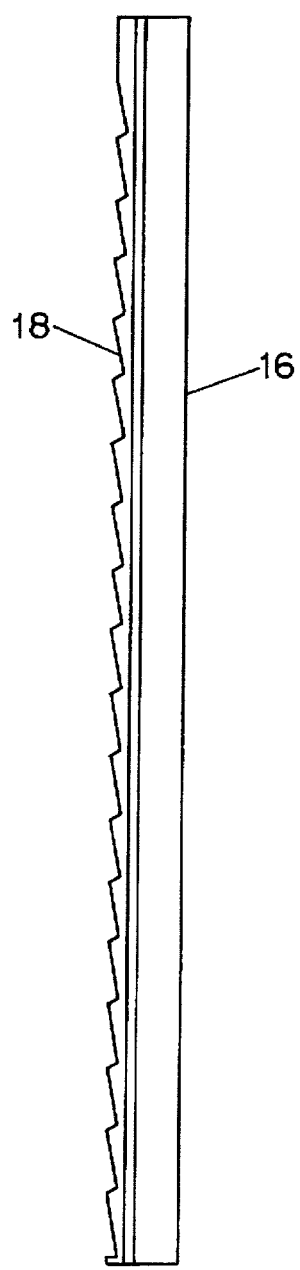
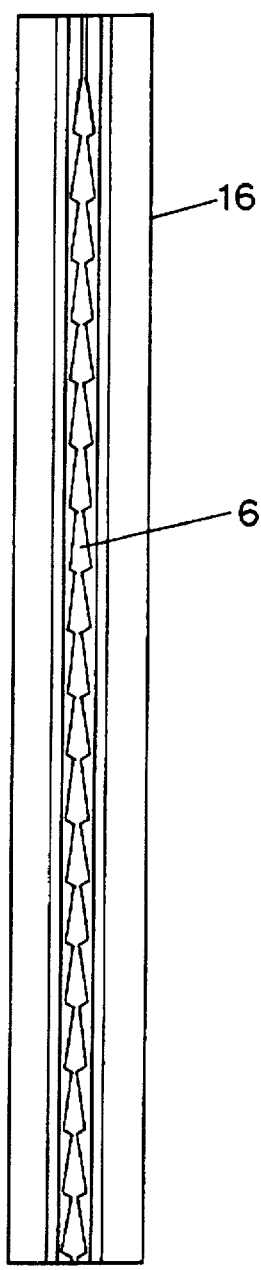
FIG. 1(a)  FIG. 2(a)  FIG. 3(a)

MECHANICALLY ADJUSTABLE WEDGE ASSEMBLY

BACKGROUND OF THE INVENTION

This invention relates to a mechanically adjustable wedge assembly which can be used to secure objects or units from movement during transport.

Conventionally objects have been secured from movement during transport by use of two complementary tapered wooden slats, or wedge pairs. One of the slats, commonly referred to as the idler, is placed in between the objects or units during loading for transport. The idler is tapered with the thicker end at the bottom. After loading is complete, the driver half of each wedge pair is installed. The driver is tapered to a point at its bottom end and is hammered into place, engaging the idler. The opposing tapers of the wedge pair cause force to be exerted against the sides of the adjacent units as the pair thickness increases due to relative motion between the idler and driver. Since the wedge pair elements are hammered into place, no control is possible over the precise amount of force applied to the side of the units in contact with the wedge pair. Such lack of control in installing the wedge pair can easily lead to excessive force being applied in installing the wedges, resulting in excessive pressure being applied to various areas of the units in contact with the wedges, and in some cases, may lead to breakage or deformation of the units. Moreover, installation of such wedges for securing a large number of objects or units having different shapes is labor intensive and requires a great deal of skill in order to minimize damage to the objects or units. Further, the extent to which wedges are uniformly installed to properly support a collection of units or objects may be affected by adverse installation conditions such as limited working space and is subject to variations in the experience of the installers.

U.S. Pat. No. 4,050,675, which is incorporated by reference herein, discloses a wedge assembly for spacing apart batteries comprising a central or inner wedge driver having a plurality of identical wedge sections. The inner wedge driver is movable between a pair of outer wedges or idlers having mating inner sections and a planar outer surface. Wedging action is produced by torquing a bolt secured to the idlers and threaded through a nut secured in the driver. The movement of the driver with respect to the idler is guided by at least two pairs of slots in the idlers which accommodate the heads of screws secured to the driver. While this wedge assembly is easier to install than wooden slat pairs, like the wooden slats it only provides for application of a securing force in two, opposite directions.

SUMMARY OF THE INVENTION

Accordingly, it is an object of the present invention to provide a wedge assembly which applies force in greater than two directions simultaneously, thereby achieving the effect of several wedges in a single unit.

Another object of the invention is to provide a wedge assembly which is rapidly and easily installed without the use of destructive force.

A further object of the invention is to provide a mechanically adjustable wedge assembly to secure objects during transport which allows for precise control in the uniform distribution of forces applied to the objects.

These and other objects of the invention are attained by providing a mechanically adjustable wedge assembly including a centrally located cruciform-shaped four legged member, and adjoining outer members mating with the adjoining surfaces of the central member when in an initial condition. The wedge assembly applies force in greater than two directions simultaneously, achieving the effect of several wedges in a single unit which is easy to install and simple to manufacture.

BRIEF DESCRIPTION OF THE DRAWINGS

Further objects and advantages of the present invention will be more fully appreciated from a reading of the detailed description when considered with the accompanying drawings wherein:

FIGS. 1(a) and 1(b) are illustrations of an elevational view of a driver and a top view of a driver and cruciform thrust plate included in a wedge assembly in accordance with the invention.

FIGS. 2(a) and 2(b) are illustrations of an elevational view of an idler and top view thereof included in a wedge assembly in accordance with the invention;

FIGS. 3(a), 3(b), 3(c) and 3(d) are, respectively, illustrations of an elevational view of a wedge assembly, a top view thereof, a magnified fragmentary top side view of FIG. 3(a) and a magnified fragmentary top side view of the wedge assembly in a laterally extended position in accordance with the invention;

DESCRIPTION OF THE PREFERRED EMBODIMENTS

Figure 3C:
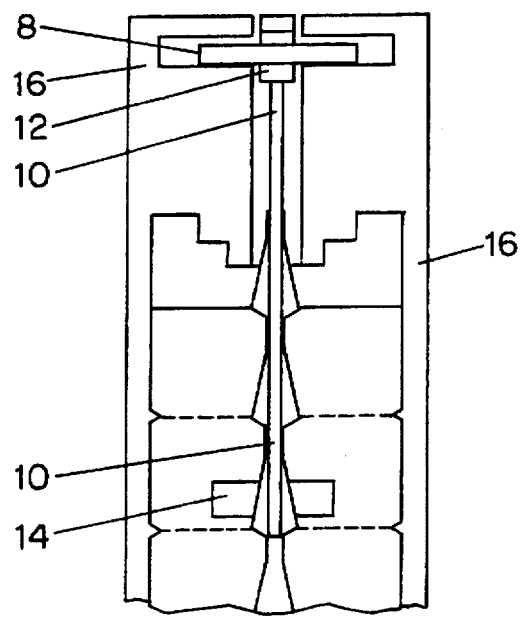

The mechanically adjustable wedge assembly in accordance with the invention includes a centrally located cruciform-shaped four legged member or driver and four mating idlers or outer members each of which includes a plurality of corresponding tapered wedge sections can be moved axially relative to one another. When in an initial condition, the inner surfaces of the outer members or idlers mate with the adjoining surfaces of the central member or cruciform-shaped driver. To provide for lateral contraction or expansion of the assembly, the central wedging component, i.e., the cruciform-shaped driver, is moved axially with respect to the fixed mating outer members or idlers. In the representative embodiment illustrated in FIGS. 1(a) and 1(b), each leg 4 of the driver 2 includes a plurality of tapered wedge sections 6. The taper angle is preferably 8° to 20° for each individual surface. The driver is provided with recesses at one end for accommodating a cruciform-shaped thrust plate 8 seated on drive bolt 10 and held in place with locking nut 12. The bolt 10 continues through the driver and is threaded through a nut 14 anchored in the driver. Preferably the driver has a diameter of five inches is 20 inches long and one inch thick tapering to ¼ inch thick between tapered sections.

A representative illustration of a mating idler 16 is shown in FIGS. 2(a) and 2(b). Each idler includes a set of recesses 18 along the sides of the idler which mate with the tapered wedge sections 6 in the driver 2 when in an initial position. As shown in FIG. 2(b), the idler is formed from two members 20 and 22 attached on one side which are preferably separated by angle of about 90°. Optionally an aluminum angle bar may be placed at the inside corner for reinforcement of the idler structure. In a preferred embodiment, the idler is formed from a single member which is bent about an angle of about 90°.

FIGS. 3(a) and 3(b) are representative illustrations of an assembled mechanically adjustable wedge in accordance with the invention in an initial position whereby the thrust plate 8 is not fully visible. If so desired, the drivers and idlers may be maintained in this position during storage by use of any suitable fastening device such as a rubber band, or by tying a rope around the assembly or the like. Upon insertion in between objects to be secured, the force from the objects themselves will hold the idlers and driver in an assembled position. In addition, any fastener system which allows the necessary movement of the wedge components may be used to maintain an assembled wedge configuration.

Figure 3D:
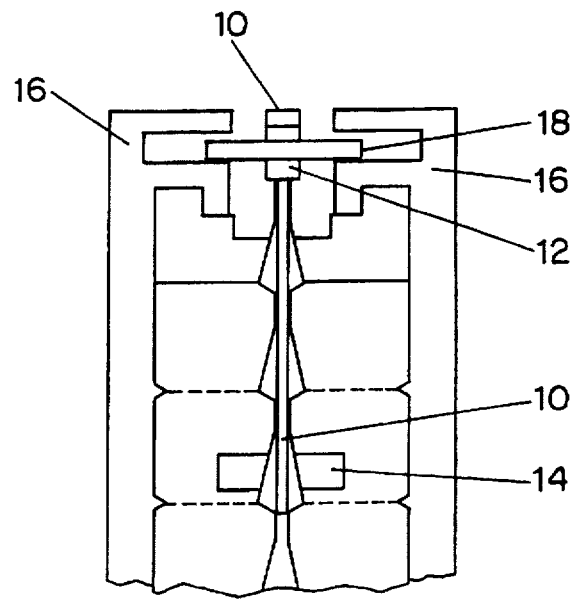

FIG. 3(c) is a magnified fragmentary view of a top portion of the wedge assembly illustrated in FIG. 3(a). The thrust plate 8 is captured in recesses in the outer members or idlers 16. FIG. 3(d) is a magnified fragmentary view of a top portion of the wedge assembly wherein the driver is moved axially upward pushing the idlers into a laterally extended position.

Figure 4:
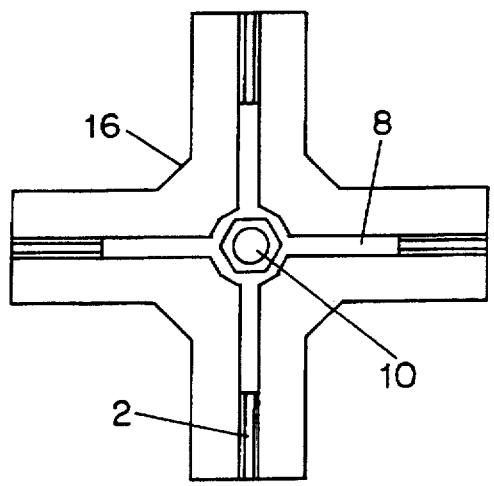
FIG. 4 is an illustration of an exploded top view of a wedge assembly in an initial condition in accordance with the invention.

Typically, as shown in the exploded top view of FIG. 4, four idlers 16 mate with the four legged central driver 2. The idler and driver may be made from any suitable material including wood and metal. Preferably the idler and driver are made from a glass reinforced plastic. Most preferably the idlers and driver are made from Vibrin-Mat L-1703 a polyester sheet molding compound available from Grace Chemical, Marco Chemical Division. The drive bolt 10 and thrust plate 8 may be made from any suitable material including wood. Preferably these components are made from a noncorrosive metal.

Figure 5:
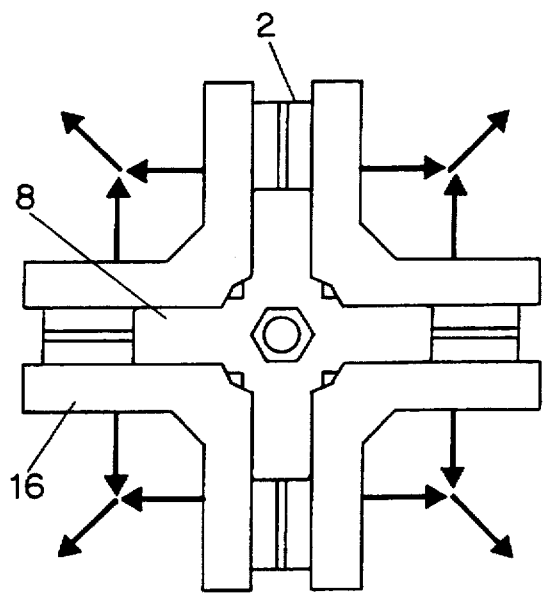
FIG. 5 is an illustration of the wedge assembly of FIG. 4 in an expanded condition and resultant forces therefrom.

The outside wedges or idlers 16 remain in axially fixed position relative to each other while the inner wedge, the cruciform-shaped driver 2, is moved axially by turning the bolt 10 through the nut 12 causing the outside wedges or idlers to move laterally from the position shown in FIG. 4 to the position shown in FIG. 5.

As the cruciform driver 2 is drawn upward out of its initial position shown in FIG. 4, by torquing the drive bolt 10, with a torque wrench each 90° idler's surface moves laterally with respect to its mating surface while the thrust plate 8 is retained in corresponding recesses in the idlers as shown in FIGS. 4 and 5. As illustrated in FIG. 5 since each idler has two surfaces separated by a 90° angle, the resultant lateral motion is the vector sum of the two forces. Since the forces are equal in magnitude the resultant lateral motion is at a 45° angle. The plurality of bearing surfaces provided by tapered wedge surfaces 6 and mating idler recesses 18 assure a uniformly distributed application of force over a large area. The wedge assembly may be removed or repositioned simply by torquing drive bolt 10 counterclockwise the required amount. The overall length of the wedge assembly remains constant during expansion or contraction while the bolt powers the wedge assembly to a desired sideways force and thickness to fill any gap.

Using a cruciform shaped driver eight pairs of surfaces engage and the four mating idlers move in different directions separated by 90° as the driver bolt is torqued. In this manner, the wedge assembly applies force in greater than the two directions simultaneously thereby achieving the effect of several wedges in a single unit.

Figure 6:
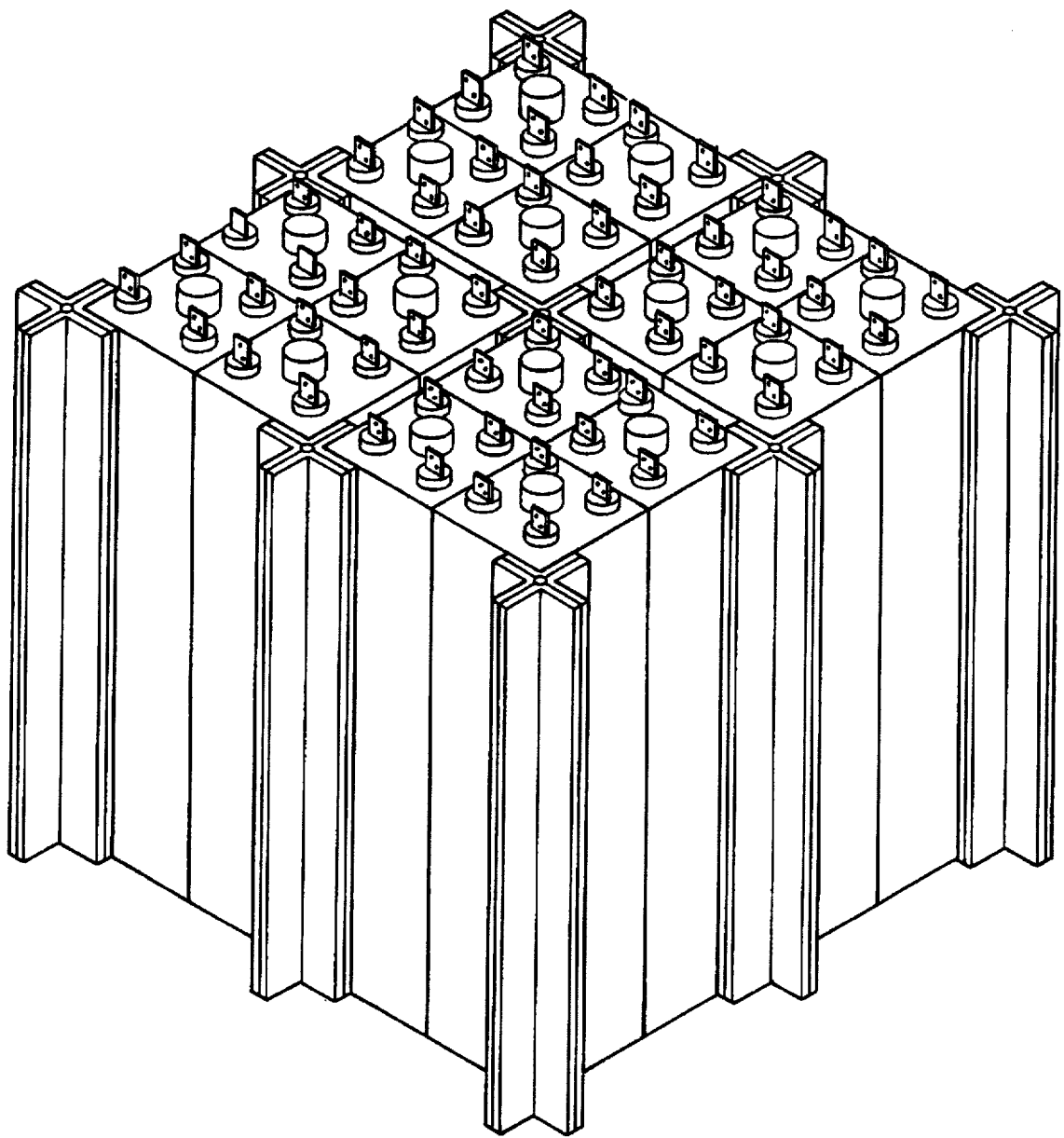
FIG. 6 is an illustration of a collection of batteries secured with a wedge assembly in accordance with the invention.

The wedge assembly according to the invention may be used to secure any object or collection of objects against movement during transport, such as a collection of batteries or cells in battery banks on submarines or other vessels or in other installations. Typical placement of the wedge assembly within a battery compartment is illustrated in FIG. 6. The cells are separated into groups of four. The wedges are located in contact with the corners of four cell groups. In this illustration the wedges are approximately the same height as the object being secured, approximately fifty inches and have a diameter of six inches. The thickness of each leg of the cruciform is approximately 1.25 inches. As is evident to those skilled in the art the wedge assembly can be of various height depending on the object to be secured.

Figure 7:
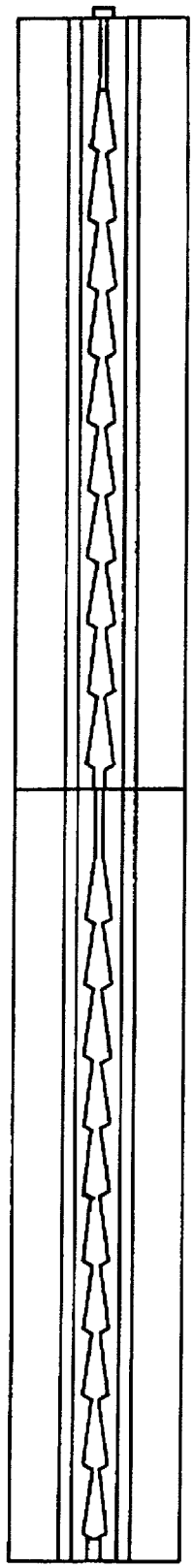
FIG. 7 is an illustration of multiple wedge assemblies stacked on top of one another in accordance with the invention.
Figure 8:
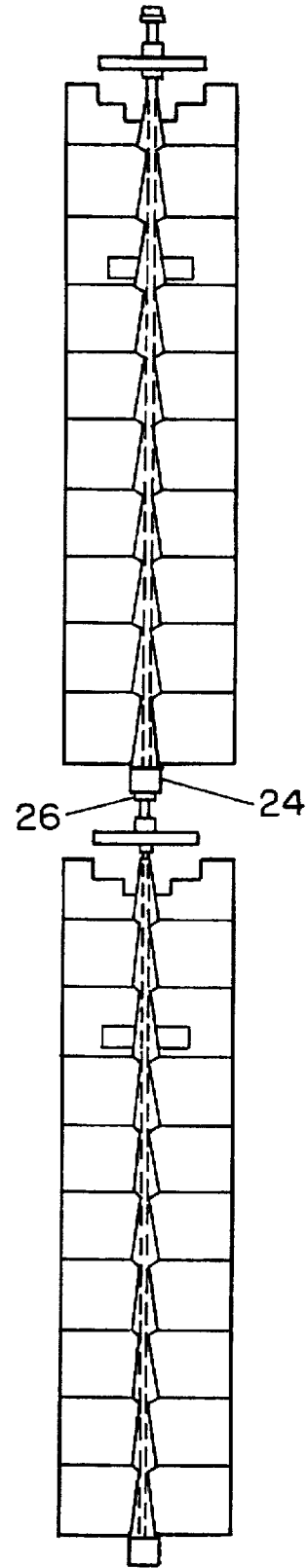
FIG. 8 is an illustration of multiple drivers included in the multiple wedge assemblies of FIG. 7.

In an alternate embodiment shown in FIG. 7 where overhead clearance above the object is restricted, multiple wedge assemblies of short lengths can be used to facilitate installation. As illustrated in FIG. 8, in that case the bottom of the bolt extending through the bottom end of the driver in an upper wedge assembly is formed as a socket 24 which engages the drive bolt of a lower wedge assembly 26. The wedge assemblies are placed one on top of another in between the objects to be secured. Upon torquing the drive bolt in the upper wedge assembly, the lower wedge assembly bolt is also engaged and rotates in a like manner to expand or contract the lower wedge assembly. Any multiple of wedge assemblies each having a socket in the bottom of the drive bolt which engages a lower wedge assembly may be used. Each wedge assembly can be used interchangeably in an upper or lower position.

Although the invention has been described herein with respect to specific embodiments, many modifications and variations therein will readily occur to those skilled in the art. Accordingly, all such variations and modifications are included with the intended scope of the invention.

I claim:

1. A mechanically adjustable wedge assembly comprising
    a centrally located cruciform-shaped four legged member and adjoining outer members, each leg of the central member having a linear succession of dual-faced oppositely-angled wedge sections, an inner surface of the outer members mating with an adjoining surfaces of the central member when in an initial condition,
    a bolt interconnecting the central and outer members and disposed in selectively extensive recesses therein,
    a nut anchored in a recess in the central member, the bolt threaded through the nut and having its head received in recesses in the outer members, and
    a cruciform-shaped thrust plate anchored in the outer members and positioned in recesses therein immediately forward of the interior face of the bolt head, the bolt extending from a position within the end of the assembly toward which the wedge sections taper substantially thereinto so as to power the central member from at least the next to the end wedge section thereof.

2. A mechanically adjustable wedge assembly according to claim 1 wherein each leg of the central member is separated by a 90° angle from another leg of the central member.

3. A mechanically adjustable wedge assembly according to claim 2 wherein two each of the adjoining members are attached on one side and separated by a 90° angle from one another.

4. A mechanically adjustable wedge assembly according to claim 3 wherein the assembly comprises glass-reinforced plastic.

5. A mechanically adjustable wedge assembly according to claim 3 wherein the assembly comprises wood.

6. A method of securing objects from movement during transport comprising the steps of:

provision a mechanically adjustable wedge assembly comprising a centrally located cruciform-shaped four legged member and adjoining outer members, each leg of the central member having a linear succession of dual-faced oppositely-angled wedge sections, an inner surfaces of the outer members mating with an adjoining surfaces of the central member when in an initial condition, a bolt interconnecting the central and outer members and disposed in selectively extensive recesses therein, a nut anchored in a recess in the central member, the bolt threaded through the nut and having its head received in recesses in the outer members, a cruciform-shaped thrust plate anchored in the outer members and positioned in recesses therein immediately forward of the interior face of the bolt head, the bolt extending from a position within the end of the assembly toward which the wedge sections taper substantially thereinto so as to power the central member from at least the next to the end wedge section thereof, torquing the bolt by engaging the nut causing movement of the central member in an axial direction whereby the central member engages the outer members, the central member forcing the outer members to move in a lateral direction and abut the object thereby preventing movement of the object during transport.

* * * * *

UNITED STATES PATENT AND TRADEMARK OFFICE
CERTIFICATE OF CORRECTION

PATENT NO. : 5,685,677

DATED : Nov. 11, 1997

INVENTOR(S) : Langley

It is certified that error appears in the above-identified patent and that said Letters Patent is hereby corrected as shown below:

Col. 4, line 46, "surfaces" should read --surface--

Col. 5, line 13, "surfaces" should read --surface--

Col. 5, line 14, "surfaces" should read --surface--

Signed and Sealed this

Fifth Day of May, 1998

*Attest:*

BRUCE LEHMAN

*Attesting Officer*    Commissioner of Patents and Trademarks